United States Patent
Chu et al.

(10) Patent No.: US 10,082,557 B1
(45) Date of Patent: Sep. 25, 2018

(54) METHODS AND APPARATUS FOR FRAME FILTERING IN SNOOP-BASED RANGE MEASUREMENTS

(71) Applicant: Marvell International Ltd., Hamilton (BM)

(72) Inventors: Liwen Chu, San Ramon, CA (US); Sagar A. Tamhane, Santa Clara, CA (US); Hongyuan Zhang, Fremont, CA (US); Hui-Ling Lou, Sunnyvale, CA (US); Kwok Shum Au, Ottawa (CA)

(73) Assignee: Marvell International Ltd., Hamilton (BM)

(*) Notice: Subject to any disclaimer, the term of this patent is extended or adjusted under 35 U.S.C. 154(b) by 98 days.

(21) Appl. No.: 15/041,911

(22) Filed: Feb. 11, 2016

Related U.S. Application Data

(60) Provisional application No. 62/114,795, filed on Feb. 11, 2015, provisional application No. 62/114,790, filed on Feb. 11, 2015.

(51) Int. Cl.
*G01S 5/06* (2006.01)
*G01S 5/02* (2010.01)
*H04L 12/26* (2006.01)
*H04B 17/30* (2015.01)

(52) U.S. Cl.
CPC ............ *G01S 5/0289* (2013.01); *H04B 17/30* (2015.01); *H04L 43/08* (2013.01)

(58) Field of Classification Search
CPC ........ G01S 5/0289; H04B 17/30; H04L 43/08
See application file for complete search history.

(56) References Cited

U.S. PATENT DOCUMENTS

| | | | |
|---|---|---|---|
| 5,740,167 A | 4/1998 | Taketsugu et al. | |
| 7,512,089 B2 | 3/2009 | Wybenga et al. | |
| 7,515,945 B2 | 4/2009 | Ruuska et al. | |
| 7,535,884 B2 | 5/2009 | Stephenson et al. | |
| 7,599,346 B2 | 10/2009 | Brommer | |
| 7,814,322 B2 | 10/2010 | Gurevich et al. | |
| 8,139,553 B2 | 3/2012 | Chang et al. | |
| 8,570,898 B1 | 10/2013 | Kopikare et al. | |
| 8,886,833 B1 | 11/2014 | Kopikare et al. | |
| 8,892,722 B1 | 11/2014 | Kopikare et al. | |
| 9,148,752 B2 | 9/2015 | Hart | |
| 9,198,119 B2 | 11/2015 | Venkatraman et al. | |
| 9,456,306 B2 * | 9/2016 | Wang | H04W 4/023 |
| 9,775,007 B2 | 9/2017 | Wang et al. | |

(Continued)

OTHER PUBLICATIONS

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

(Continued)

*Primary Examiner* — Tejis Daya

(57) ABSTRACT

A first communication device receives a packet that includes scheduling information for a range measurement signal exchange session between a second communication device and a third communication device. The first communication device determines when the range measurement signal exchange session will occur using the scheduling information in the packet, and observes the range measurement signal exchange session. The first communication device performs an initial analysis of the range measurement packets by analyzing transmitter addresses in the range measurement packets to determine whether to further process the range measurement packets for range measurement purposes, and determines range measurements based on observing the one range measurement signal exchange session.

18 Claims, 9 Drawing Sheets

(56) References Cited

U.S. PATENT DOCUMENTS

| | | | |
|---|---|---|---|
| 2002/0147819 | A1 | 10/2002 | Miyakoshi et al. |
| 2005/0053015 | A1 | 3/2005 | Jin et al. |
| 2005/0135286 | A1 | 6/2005 | Nurminen et al. |
| 2006/0126622 | A1 | 6/2006 | Park et al. |
| 2007/0171922 | A1 | 7/2007 | Jabri et al. |
| 2007/0237210 | A1 | 10/2007 | Voglewede et al. |
| 2007/0297352 | A1 | 12/2007 | Jabri et al. |
| 2008/0092204 | A1 | 4/2008 | Bryce et al. |
| 2009/0103501 | A1 | 4/2009 | Farrag et al. |
| 2009/0109946 | A1 | 4/2009 | Morton et al. |
| 2009/0310619 | A1 | 12/2009 | Brommer |
| 2010/0020746 | A1 | 1/2010 | Zaks |
| 2011/0010246 | A1 | 1/2011 | Kasslin et al. |
| 2013/0036231 | A1 | 2/2013 | Suumaki |
| 2013/0250931 | A1 | 9/2013 | Abraham et al. |
| 2014/0057670 | A1 | 2/2014 | Lim et al. |
| 2014/0093005 | A1 | 4/2014 | Xia et al. |
| 2014/0152437 | A1 | 6/2014 | Tian et al. |
| 2014/0160959 | A1* | 6/2014 | Aldana ............... H04L 43/0864 370/252 |
| 2014/0187259 | A1* | 7/2014 | Kakani ................. H04W 64/00 455/456.1 |
| 2014/0282877 | A1 | 9/2014 | Mahaffey et al. |
| 2014/0295877 | A1* | 10/2014 | Hart ........................ H04W 4/02 455/456.1 |
| 2014/0335885 | A1* | 11/2014 | Steiner .................. H04W 64/00 455/456.1 |
| 2014/0368334 | A1 | 12/2014 | Tian et al. |
| 2015/0049716 | A1* | 2/2015 | Gutierrez .............. H04W 84/12 370/329 |
| 2015/0063138 | A1* | 3/2015 | Aldana ................. H04W 24/02 370/252 |
| 2015/0063226 | A1* | 3/2015 | Hsu ........................ H04B 7/022 370/329 |
| 2015/0063228 | A1* | 3/2015 | Aldana ................. G01S 5/0081 370/329 |
| 2015/0085669 | A1* | 3/2015 | Prechner ............... H04W 24/10 370/241 |
| 2015/0098460 | A1* | 4/2015 | Wang ...................... H04W 4/08 370/338 |
| 2015/0139212 | A1* | 5/2015 | Wang ........................ G01S 5/06 370/338 |
| 2015/0139213 | A1 | 5/2015 | Abraham et al. |
| 2015/0230283 | A1 | 8/2015 | Li et al. |
| 2015/0282230 | A1 | 10/2015 | Kim |
| 2015/0341892 | A1* | 11/2015 | Aldana .................. H04W 64/00 455/456.2 |
| 2015/0365805 | A1* | 12/2015 | Bajko .................... G01S 13/767 455/456.1 |
| 2015/0365913 | A1 | 12/2015 | Aldana |
| 2015/0382152 | A1* | 12/2015 | Lindskog .............. H04L 5/0055 455/456.2 |
| 2015/0382287 | A1 | 12/2015 | Kim et al. |
| 2016/0021495 | A1* | 1/2016 | Segev ................... H04W 40/20 455/456.3 |
| 2016/0183057 | A1* | 6/2016 | Steiner .................. H04W 4/027 455/456.1 |
| 2016/0183171 | A1* | 6/2016 | Hareuveni ............ H04W 64/00 370/328 |
| 2017/0115372 | A1* | 4/2017 | Abinader, Jr. ............ G01S 5/02 |

OTHER PUBLICATIONS

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).

IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

IEEE Std. 1588™-2008 (Revision of IEEE Std. 1588-2002), "IEEE Standard for a Precision Clock Synchronization Protocol for Networked Measurement and Control Systems," *The Institute for Electrical and Electronics Engineers, Inc.*, IEEE Standard, pp. 1-289 (Jul. 24, 2008).

IEEE P1588™ D2.2 "Draft Standard for a Precision Clock Synchronization Protocol for Networked Measurement and Control Systems," *The Institute of Electrical and Electronics Engineers, Inc.*, 2008.

IEEE Std. C37.238™-2011, "IEEE Standard Profile for Use of IEEE 1588™ Precision Time Protocol in Power System Applications," *Institute for Electrical and Electronics Engineers, Inc.*, pp. 1-66 (Jul. 2011).

ITU-T Recommendation G.8265.1/Y.1365.1, "Precision time protocol telecom profile for frequency synchronization," *Int'l Telecommunication Union*, pp. 1-28 (Oct. 2010).

Aldana et al., IEEE P802.11—Wireless LANs, "CIDs 46,47,48 Regarding Fine Timing Measurement," *The Institute of Electrical and Electronics Engineers, Inc.*, doc.: IEEE 802.11 11-12-1249-04-000m, pp. 1-17 (Jan. 2013).

Gurewitz et al., "Estimating One-Way Delays from Cyclic-Path Delay Measurements," Proc. of Twentieth Annual Joint Conf. of the IEEE Computer and Comm. Societies (IEEE INFOCOM 2001), vol. 2, pp. 1038-1044 (2001).

Gurewitz et al., "One-Way Delay Estimation Using Network Wide Measurements," IEEE Trans. on Information Theory, vol. 52, No. 6, pp. 2710-2724 (2006).

Lee, "An Enhanced IEEE 1588 Time Synchronization Algorithm for Asymmetric Communication Link Using Block Burst Transmission," IEEE Communications Letters, vol. 12, No. 9, pp. 687-689 (Sep. 2008).

Lv et al., "An Enhanced IEEE 1588 Time Synchronization for Asymmetric Communication Link in Packet Transport Network," IEEE Communications Letters, vol. 14. No. 8. pp. 764-766 (Aug. 2010).

Mills et al., "Network Time Protocol Version 4: Protocol and Algorithms Specification," Request for Comments: 5905, *Internet Engineering Task Force (IETF)*, pp. 1-111 (Jun. 2010).

Mills, "Internet Time Synchronization: The Network Time Protocol," Network Working Group Request for Comments, No. 1129, pp. 1-29 (Oct. 1989).

Peer-to-Peer Technical Specification, Revision 1.0, Wi-Fi Alliance Peer-to-Peer Technical Task Group, May 12, 2009; 43 pages.

Vegt, "Location MRD Submission on Wi-Fi Direct Based STA-STA FTM ranging," Wireless Network Management, Apr. 4, 2014—9 pages.

Wi-Fi Peer-to-Peer (P2P) Technical Specification, Revision 1.2, Wi-Fi Alliance Technical Committee P2P Task Group, (2010) 159 pages.

Zarick et al., "The Impact of Network Latency on the Synchronization of Real-World IEEE 1588-2008 Devices," Proc. of the 2010 Int'l IEEE Symposium on Precision Clock Synchronization for Measurement, Control and Communication, pp. 135-140 (Sep. 27-Oct. 1, 2010).

U.S. Appl. No. 14/687,705, Chu et al., "Peer to Peer Ranging Exchange," filed Apr. 15, 2015.

U.S. Appl. No. 15/041,954, Chu et al., "Methods and Apparatus for Range Measurement," filed Feb. 11, 2016.

(56) References Cited

OTHER PUBLICATIONS

Office Action in U.S. Appl. No. 15/041,954, dated Oct. 27, 2016 (18 pages).
Office Action in U.S. Appl. No. 15/041,954, dated Mar. 20, 2017 (18 pages).
IEEE Std 802.11-REVmc™/D4.0, Jan. 2015 "Draft Standard for Information technology—Telecommunications and information exchange between systems—Local and metropolitan area networks—Specific requirements, Part 11: Wireless LAN Medium Access Control (MAC) and Physical Layer (PHY) Specifications," *The Institute of Electrical and Electronics Engineers, Inc.*, pp. i-cii, 293-297, 340-344, 390-392, 765, 766, 814-816, 853-859, 895-897, 1050-1054, 1137-1140, 1538-1547, 1673-1676, 1709, 1710, 1734-1743, 2152-2154, 3565, 3566 (Jan. 2015).
IEEE Std 802.11-REVmc™/D5.0, Jan 2016, "Draft Standard for Information technology—Telecommunications and information exchange between systems—Local and metropolitan area networks—Specific requirements, Part 11: Wireless LAN Medium Access Control (MAC) and Physical Layer (PHY) Specifications," *The Institute of Electrical and Electronics Engineers, Inc.*, pp. i-ciii, 293-297, 339-343, 389-391, 777, 778, 825-827, 864-870, 907-909, 1063-1067, 1157-1160, 1554-1572, 1702-1707, 1739, 1740, 1764-1773, 2188, 2189, 3597, 3598 (Jan. 2016).
Office Action in U.S. Appl. No. 15/041,954, dated Jul. 24, 2017 (20 pages).
Office Action in U.S. Appl. No. 15/041,954, dated Mar. 20, 2018 (17 pages).
Office Action in U.S. Appl. No. 15/041,954, dated Nov. 28, 2017 (20 pages).

\* cited by examiner

US 10,082,557 B1

METHODS AND APPARATUS FOR FRAME FILTERING IN SNOOP-BASED RANGE MEASUREMENTS

CROSS REFERENCES TO RELATED APPLICATIONS

This application claims the benefit of U.S. Provisional Patent App. No. 62/114,795, entitled "FTM Parameters and MCS Rules in Snoop Based Range Measurement," filed on Feb. 11, 2015, and U.S. Provisional Patent App. No. 62/114,790, entitled "FTM Frame Filtering in Snoop Based Range Measurement," filed on Feb. 11, 2015, the disclosures of which are hereby expressly incorporated herein by reference in their entireties.

Additionally, this application is related to U.S. patent application Ser. No. 15/041,954, entitled "Methods and Apparatus for Range Measurement," filed on the same day as the present application, the disclosure of which is hereby expressly incorporated herein by reference in its entirety.

FIELD OF TECHNOLOGY

The present disclosure relates generally to wireless communication systems and, more particularly, to determining distances between wireless communication devices.

BACKGROUND

In some wireless communication systems, it may be useful to determine positions of wireless communication devices. Some techniques for determining positions of wireless communication devices involve determining distances between communication devices, and using distance measurements to calculate positions of the devices. A distance between two device can be determined by transmitting a signal from one device to another, determining the time it took for the signal to travel between the two devices (time of flight), and then calculating the distance between the two devices based on the time of flight.

SUMMARY

In an embodiment, a method includes receiving, at a first communication device, a packet that includes scheduling information for a range measurement signal exchange session between a second communication device and a third communication device, and determining, at the first communication device, when the range measurement signal exchange session will occur using the scheduling information in the packet. The method also includes, in response to determining when the range measurement signal exchange session will occur using the scheduling information in the packet, observing, with the first communication device, the range measurement signal exchange session. Observing the range measurement signal exchange session comprises performing an initial analysis of range measurement packets received at the first communication device by analyzing transmitter addresses in the range measurement packets to determine whether to further process the range measurement packets for range measurement purposes. The method further includes determining, at the first communication device, range measurements based on observing the one range measurement signal exchange session.

In another embodiment, an apparatus comprises a network interface device associated with a first communication device. The network interface device includes one or more integrated circuits (ICs) configured to: receive a packet that includes scheduling information for a range measurement signal exchange session between a second communication device and a third communication device; determine when the range measurement signal exchange session will occur using the scheduling information in the packet; and in response to determining when the range measurement signal exchange session will occur using the scheduling information in the packet, observe the range measurement signal exchange session, including performing an initial analysis of range measurement packets received at the first communication device by analyzing transmitter addresses in the range measurement packets to determine whether to further process the range measurement packets for range measurement purposes. The one or more ICs are, or a separate processor of the apparatus is, configured to determine range measurements based on observing the one range measurement signal exchange session.

In yet another embodiment, a tangible, non-transitory computer readable medium, or media, stores machine readable instructions that, when executed by one or more processors of a first communication device, cause the one or more processors to: determine when a range measurement signal exchange session between a second communication device and a third communication device will occur using scheduling information in a packet received by the first communication device; in response to determining when the range measurement signal exchange session will occur using the scheduling information in the packet, perform an initial analysis of range measurement packets received at the first communication device as part of an observation, by the first communication device, of the range measurement signal exchange session, including analyzing transmitter addresses in the range measurement packets to determine whether to further process the range measurement packets for range measurement purposes; and determine range measurements based on observing the range measurement signal exchange session.

DETAILED DESCRIPTION

Range calculation techniques described below are discussed in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, range calculation techniques are utilized in other types of wireless communication systems.

Figure 1:
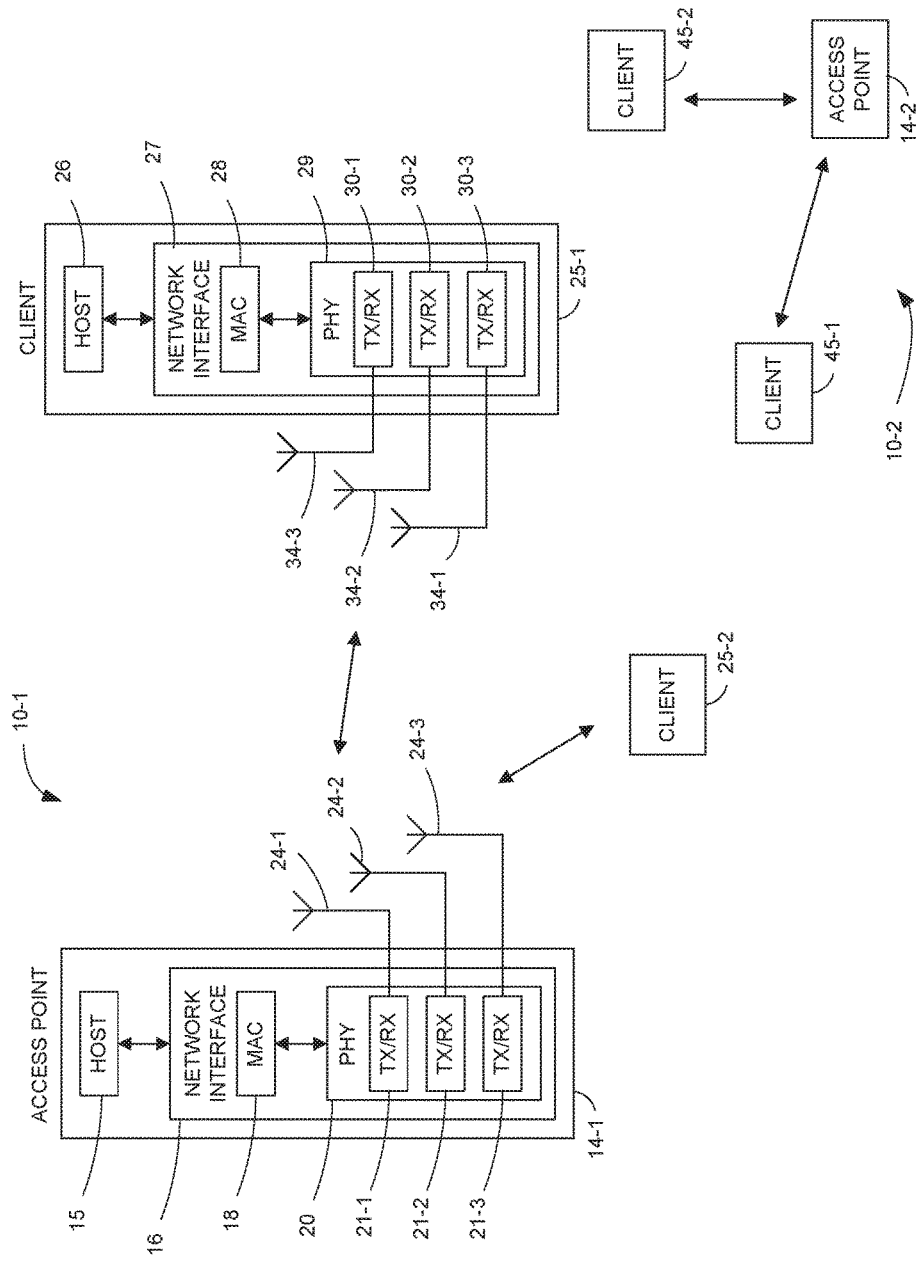
FIG. 1 is a block diagram of an example system having multiple wireless local area networks (WLANs), according to an embodiment.

FIG. 1 is a block diagram of an example system including multiple WLANs 10, according to an embodiment. For example, a first WLAN 10-1 includes an access point (AP) 14-1 that comprises a host processor 15 coupled to a network interface device 16. In an embodiment, the network interface 16 includes one or more integrate circuits (ICs) configured to operate as discussed below. The network interface 16 includes a medium access control (MAC) processor 18 and a physical layer (PHY) processor 20. The PHY processor 20 includes a plurality of transceivers 21, and the transceivers 21 are coupled to a plurality of antennas 24. Although three transceivers 21 and three antennas 24 are illustrated in FIG. 1, the AP 14-1 includes other suitable numbers (e.g., 1, 2, 4, 5, etc.) of transceivers 21 and antennas 24 in other embodiments. In some embodiments, the AP 14-1 includes a higher number of antennas 24 than transceivers 21, and antenna switching techniques are utilized. In an embodiment, the MAC processor 18 is implemented on at least a first IC, and the PHY processor 20 is implemented on at least a second IC. In an embodiment, at least a portion of the MAC processor 18 and at least a portion of the PHY processor 20 are implemented on a single IC.

The WLAN 10-1 includes a plurality of client stations 25. Although two client stations 25 are illustrated in FIG. 1, the WLAN 10-1 includes other suitable numbers (e.g., 1, 3, 4, 5, 6, etc.) of client stations 25 in various scenarios and embodiments. The client station 25-1 includes a host processor 26 coupled to a network interface device 27. In an embodiment, the network interface 27 includes one or more ICs configured to operate as discussed below. The network interface 27 includes a MAC processor 28 and a PHY processor 29. The PHY processor 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In some embodiments, the client station 25-1 includes a higher number of antennas 34 than transceivers 30, and antenna switching techniques are utilized. In an embodiment, the MAC processor 28 is implemented on at least a first IC, and the PHY processor 29 is implemented on at least a second IC. In an embodiment, at least a portion of the MAC processor 28 and at least a portion of the PHY processor 29 are implemented on a single IC.

In an embodiment, the client station 25-2 has a structure that is the same as or similar to the client station 25-1. In these embodiments, the client station 25-2 structured the same as or similar to the client station 25-1 has the same or a different number of transceivers and antennas. For example, the client station 25-2 has only two transceivers and two antennas (not shown), according to an embodiment.

The system illustrated in FIG. 1 also includes a WLAN 10-2. The WLAN 10-2 includes an AP 14-2 and a plurality of client stations 45. In an embodiment, the AP 14-2 has a structure that is the same as or similar to the AP 14-1. In these embodiments, the AP 14-2 structured the same as or similar to the AP 14-1 has the same or a different number of transceivers and antennas. For example, the AP-2 has only two transceivers and two antennas (not shown), according to an embodiment.

In an embodiment, the client stations 45 each have a respective structure that is the same as or similar to the client station 25-1. In these embodiments, each client station 45 structured the same as or similar to the client station 25-1 has the same or a different number of transceivers and antennas. For example, the client station 45-1 has only two transceivers and two antennas (not shown), according to an embodiment.

Although two client stations 45 are illustrated in FIG. 1, the WLAN 10-2 includes other suitable numbers (e.g., 1, 3, 4, 5, 6, etc.) of client stations 45 in various scenarios and embodiments.

In some embodiments, the AP 14-1 (AP1) exchanges range measurement signals with the AP 14-2 (AP2) to determine a distance between communication devices in the system of FIG. 1. In some embodiments, the determined distances between communication devices are used to determine positions of communication devices in the system of FIG. 1, for example. In some embodiments, a client station 25, 45 ("observing station") receives the range measurement signals exchanged between AP1 and AP2, and the time of arrival of the range measurement signals at the observing station is utilized to determine a distance(s) between the observing station and AP1 and/or AP2, and/or utilized to determine a location of the observing station using a known location(s) of AP1 and/or AP2.

Figure 2A:
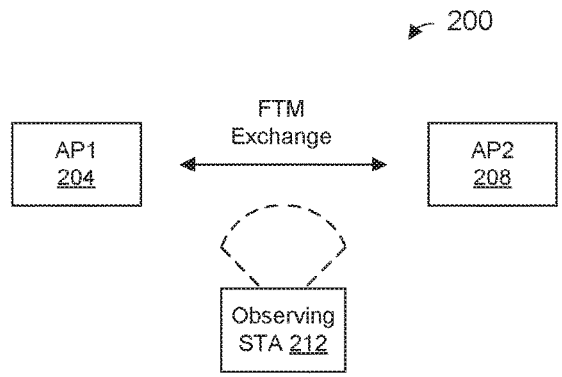
FIG. 2A is a block diagram of an example system in which an observing station observes range measurement signals exchanged between two access points, according to an embodiment.

FIG. 2A is a diagram of an example system 200 in which a first AP 204 (AP1) exchanges range measurement signals with a second AP 208 (AP2), according to an embodiment. The system 200 includes a client station 212 ("observing station 212") that also receives the range measurement signals exchanged between AP1 and AP2. Range measurement signals are sometimes referred to herein as "fine timing measurement signals" or "FTM signals"). In an embodiment, AP1 is the AP 14-1 of FIG. 1, AP2 is the AP 14-2 of FIG. 1, and the client station 212 is the client station 25-1 of FIG. 1. In other embodiments, AP1, AP2, and client station 212 are wireless communication devices having different suitable structures than the AP 14-1, the AP 14-2, and the client station 25-1 of FIG. 1. Although only one observing station 212 is illustrated in FIG. 2A, there are multiple observing stations in other embodiments and/or scenarios.

Figure 2B:
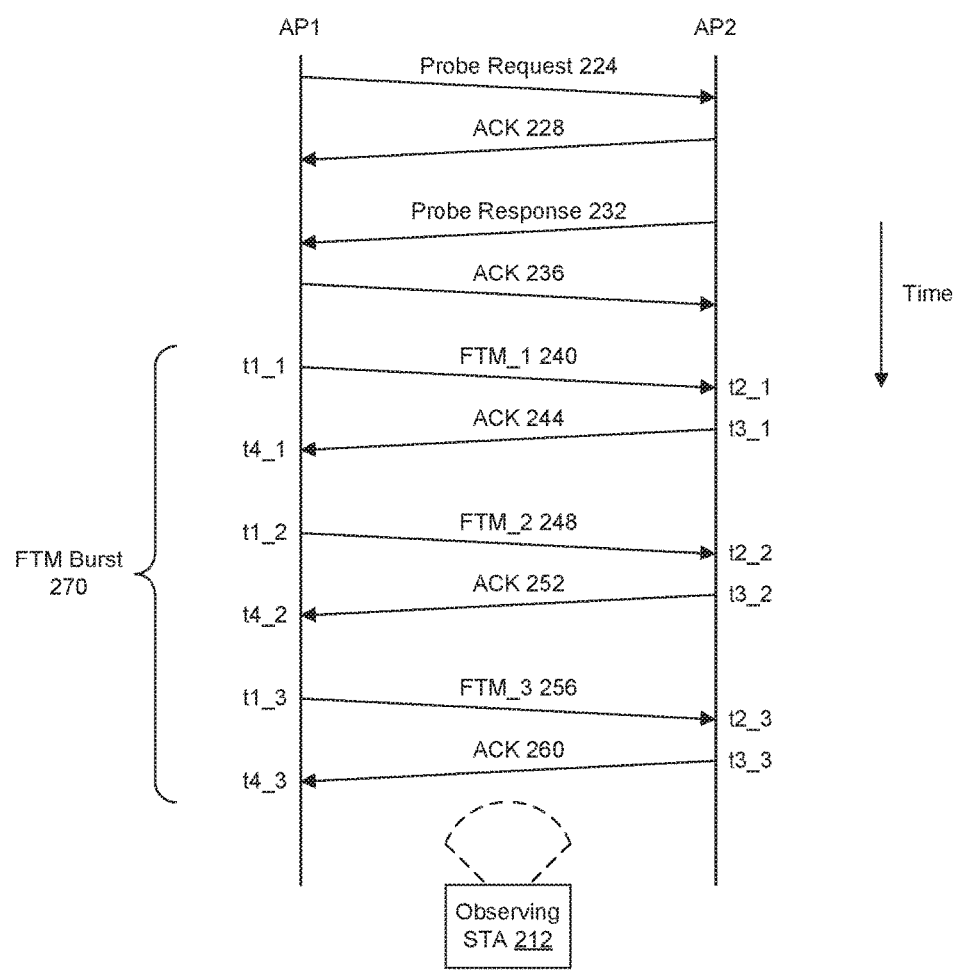
FIG. 2B is a signal timing diagram illustrating an example exchange of range measurement signals between the two access points of FIG. 2A, according to an embodiment.

In some embodiments, the system 200 performs an FTM procedure in which AP1 and AP2 exchange FTM signals while the client station 212 observes the exchange of signals. For instance, FIG. 2B is a signal timing diagram illustrating an example FTM procedure between AP1 and AP2, in which the client station 212 observes FTM signal exchanges between AP1 and AP2.

AP1 generates and transmits a probe request packet 224. In response to the probe request packet 224, AP2 generates and transmits an acknowledgment (ACK) packet 228. In an embodiment, AP2 is configured to transmit the ACK packet 228 a predetermined amount of time T_ack after receiving an end of the probe request packet 224. For example, a communication protocol defines the predetermined amount of time, in an embodiment. In an embodiment, the predetermined amount of time T_ack is a short interface space (SIFS) as defined by the IEEE 802.11 Standard. In other embodiments, the predetermined amount of time T_ack is another suitable value.

Also in response to the probe request packet 224, AP2 generates and transmits a probe response packet 232. In response to the probe response packet 232, AP1 generates and transmits an ACK packet 236. In an embodiment, AP1 transmits the ACK packet 236 T_ack after an end of the probe response packet 232 is received. In some embodiments, AP2 transmits the ACK packet 228 after an amount of time that is greater than T_ack after receiving an end of the probe request packet 224. For example, in some scenarios, processing delays in AP2 may result in AP2 transmitting the ACK packet 228 after an amount of time that is greater than T_ack after receiving an end of the probe request packet 224. In some embodiments, AP1 transmits the ACK packet 236 after an amount of time that is greater than T_ack after receiving the end of the probe response packet 232. For example, in some scenarios, processing delays in AP1 may result in AP1 transmitting the ACK packet 236 after an amount of time that is greater than T_ack after receiving the end of the probe response packet 232.

In some embodiments, transmission of the probe request packet 224 and the probe response packet 232 (and the corresponding ACK packets 228, 236) is omitted. For example, in some embodiments, AP2 transmits information included in the probe response packet 232 in beacons. Thus, if AP1 receives a beacon transmitted by AP2, AP1 does not transmit the probe request packet 224, in some embodiments.

AP1 generates an FTM packet 240 (FTM_). At a time t1_1, AP1 transmits the FTM packet 240, and AP1 records the time t1_1. In an embodiment, the time t1_1 corresponds to an event at which a beginning of the FTM packet 240 is transmitted. In an embodiment, AP1 generates the FTM packet 240 to include a time stamp with the value t1_1. In other embodiments, AP1 does not include a time stamp with the value t1_1 in the FTM packet 240.

At time t2_1, AP2 receives the FTM packet 240. In an embodiment, AP2 records the time t2_1 at which the FTM packet 240 was received at AP2. In other embodiments, AP2 does not record the time t2_1 at which the FTM packet 240 was received.

The observing station 212 also receives the FTM packet 240 at time t2_obs_1, and the observing station 212 records the time t2_obs_1. In an embodiment, the time t2_obs_1 corresponds to an event at which a beginning of the FTM packet 240 is received at the observing station 212.

In response to the FTM packet 240, AP2 generates and transmits an ACK packet 244. In an embodiment, AP2 transmits the ACK packet 244 at a time t3_1. In an embodiment, time t3_1 corresponds to t2_1+T_ack. In an embodiment, AP2 records the time t3_1 at which AP2 transmits the ACK packet 244. In other embodiments, AP2 does not record the time t3_1. In some embodiments, t3_1 is greater than t2_1+T_ack. For example, in some scenarios, processing delays in AP2 may result in t3_1 being greater than t2_1+T_ack.

At time t4_1, AP1 receives the ACK packet 244. In an embodiment, AP1 records the time t4_1 at which AP1 receives the ACK packet 244. In an embodiment, the time t4_1 corresponds to an event at which a beginning of the ACK packet 244 is received at AP1.

The observing station 212 also receives the ACK packet 244 at time t4_obs_1, and the observing station 212 records the time t4_obs_1. In an embodiment, the time t4_obs_1 corresponds to an event at which a beginning of the ACK packet 244 is received at the observing station 212.

Transmission of an FTM packet and a responsive ACK packet (e.g., the FTM packet 240 and the responsive ACK packet 244) is sometimes referred to herein as an FTM exchange. Thus, the FTM packet 240 and the responsive ACK packet 244 correspond to one FTM exchange. In some embodiments, an FTM signal exchange procedure comprises multiple FTM exchanges.

For instance, FIG. 2B illustrates three FTM signal exchanges. In particular, as part of a second FTM exchange, AP1 generates an FTM packet 248 (FTM_2). At a time t1_2, AP1 transmits the FTM packet 248, and AP1 records the time t1_2. In an embodiment, the time t1_2 corresponds to an event at which a beginning of the FTM packet 248 is transmitted. In an embodiment, AP1 generates the FTM packet 248 to include a time stamp with the value t1_2. In other embodiments, AP1 does not include a time stamp with the value t1_2 in the FTM packet 248. In an embodiment, AP1 generates the FTM packet 248 to include times t1_1 and t4_1, e.g., in a PHY payload portion of the FTM packet 248.

At time t2_2, AP2 receives the FTM packet 248. In an embodiment, AP2 records the time t2_2 at which the FTM packet 248 was received at AP2. In other embodiments, AP2 does not record the time t2_2 at which the FTM packet 248 was received.

The observing station 212 also receives the FTM packet 248 at time t2_obs_2, and the observing station 212 records the time t2_obs_2. In an embodiment, the time t2_obs_2 corresponds to an event at which a beginning of the FTM packet 248 is received at the observing station 212. As discussed above, in an embodiment, the FTM packet 248 includes times t1_1 and t4_1, e.g., in a PHY payload portion of the FTM packet 248. Thus, in an embodiment, the observing station 212 records the times t1_1 and t4_1 that were included in the FTM packet 248.

In response to the FTM packet 248, AP2 generates and transmits an ACK packet 252. In an embodiment, AP2 transmits the ACK packet 252 at a time t3_2. In an embodiment, time t3_2 corresponds to t2_2+T_ack. In an embodiment, AP2 records the time t3_2 at which AP2 transmits the ACK packet 252. In other embodiments, AP2 does not record the time t3_2. In some embodiments, t3_2 is greater than t2_2+T_ack. For example, in some scenarios, processing delays in AP2 may result in t3_2 being greater than t2_2+T_ack.

At time t4_2, AP1 receives the ACK packet 252. In an embodiment, AP1 records the time t4_2 at which AP1 receives the ACK packet 252. In an embodiment, the time t4_2 corresponds to an event at which a beginning of the ACK packet 252 is received at AP1.

The observing station 212 also receives the ACK packet 252 at time t4_obs_2, and the observing station 212 records the time t4_obs_2. In an embodiment, the time t4_obs_2 corresponds to an event at which a beginning of the ACK packet 252 is received at the observing station 212.

As part of a third FTM exchange, AP1 generates an FTM packet 256 (FTM_3). At a time t1_3, AP1 transmits the FTM packet 256, and AP1 records the time t1_3. In an embodiment, the time t1_3 corresponds to an event at which a beginning of the FTM packet 256 is transmitted. In an embodiment, AP1 generates the FTM packet 256 to include a time stamp with the value t1_3. In other embodiments, AP1 does not include a time stamp with the value t1_3 in the FTM packet 256. In an embodiment, AP1 generates the FTM packet 256 to include times t1_2 and t4_2, e.g., in a PHY payload portion of the FTM packet 256.

At time t2_3, AP2 receives the FTM packet 256. In an embodiment, AP2 records the time t2_3 at which the FTM packet 256 was received at AP2. In other embodiments, AP2 does not record the time t2_3 at which the FTM packet 256 was received.

The observing station 212 also receives the FTM packet 256 at time t2_obs_3, and the observing station 212 records the time t2_obs_3. In an embodiment, the time t2_obs_3 corresponds to an event at which a beginning of the FTM packet 256 is received at the observing station 212. As discussed above, in an embodiment, the FTM packet 256 includes times t1_2 and t4_2, e.g., in a PHY payload portion of the FTM packet 256. Thus, in an embodiment, the observing station 212 records the times t1_2 and t4_2 that were included in the FTM packet 256.

In response to the FTM packet 256, AP2 generates and transmits an ACK packet 260. In an embodiment, AP2 transmits the ACK packet 260 at a time t3_3. In an embodiment, time t3_3 corresponds to t2_3+T_ack. In an embodiment, AP2 records the time t3_3 at which AP2 transmits the ACK packet 260. In other embodiments, AP2 does not record the time t3_3. In some embodiments, t3_3 is greater than t2_3+T_ack. For example, in some scenarios, processing delays in AP2 may result in t3_3 being greater than t2_3+T_ack.

At time t4_3, AP1 receives the ACK packet 260. In an embodiment, AP1 records the time t4_3 at which AP1 receives the ACK packet 260. In an embodiment, the time t4_3 corresponds to an event at which a beginning of the ACK packet 260 is received at AP1.

The observing station 212 also receives the ACK packet 260 at time t4_obs_3, and the observing station 212 records the time t4_obs_3. In an embodiment, the time t4_obs_3 corresponds to an event at which a beginning of the ACK packet 260 is received at the observing station 212.

A group of FTM exchanges is referred to herein as an FTM burst. For example, an FTM burst 270 includes the three FTM exchanges associated with FTM_1, FTM_2, and FTM_3. As will be describe in more detail below, in an embodiment, an FTM burst may include other suitable number of FTM exchanges, such as one, two, four, five, six, etc.

A location of the observing station 212 can be determined in part with a differential distance $D_{SR}$ between the observing station 212 and each of AP1 and AP2, where $$D_{SR}=c\times(T_{SO}-T_{RO}) \qquad \text{Equation 1}$$

where c is the speed of light, $T_{SO}$ is a time of flight between AP1 and the observing station 212, and $T_{RO}$ is a time of flight between AP2 and the observing station 212. In some embodiments, a location of the observing station 212 can be determined using i) $D_{SR}$, and ii) a) a known location of AP1, and/or b) a known location of AP2.

In an embodiment, the differential distance DR between the observing station 212 and each of AP1 and AP2 can be calculated as $$D_{SR}=c\times(t4\_obs-t2\_obs-T-(t4-t1)) \qquad \text{Equation 2}$$

where t4_obs is one of t4_obs_1, t4_obs_2, and t4_obs_3; t2_obs is one of t2_obs_1, t2_obs_2, and t2_obs_3; t4 is one of t4_1, t4_2, and t4_3; t1 is one of t1_1, t1_2, and t1_3; and T is a time of flight of a line of sight transmission from AP1 to AP2. In an embodiment, T is calculated as $$T=t4-t1-T\_ack \qquad \text{Equation 3}$$

In other embodiments, T is calculated as $$T=t2-t1 \qquad \text{Equation 4}$$

where t2 is one of t2_1, t2_2, and t2_3. In another embodiment, when the locations of AP1 and AP2 are known, T is calculated by dividing the distance between AP1 and AP2 by the speed of light c.

In various embodiments, DR, is calculated at one or more of AP1, AP2, the observing station 212, or another suitable device (not shown in FIG. 2A). Thus, in various embodiments, time values and other parameters (if any) necessary for calculating $D_{SR}$ are sent to the device calculating the $D_{SR}$ (the "calculating device") if the calculating device does not already have the time values/parameters.

As shown in the example of FIG. 2B, AP2 merely responds to FTM packets from AP1 with ACKs. Thus, in some embodiments, AP2 is not configured to transmit FTM signals and/or initiate FTM exchanges. For example, in an embodiment, the AP2 is a legacy device that is configured to support an older communication protocol (e.g., IEEE 802.11a), whereas FTM exchanges are defined by a more recent communication protocol that is backward compatible with the older communication protocol. Thus, for example, AP2 responds to FTM packets from AP1 with ACKs but may not be able to understand all of the contents of the FTM packets. In other embodiments, however, AP2 is able to understand all of the contents of the FTM packets from AP1.

In some embodiments, the communication protocol utilized by AP1, AP2, and the observing station 212 defines, for a particular PPDU format, mandatory i) rates, ii) modulation and coding schemes (MCSs), iii) numbers of spatial streams, and/or iv) mandatory combinations of a) MCSs and b) numbers of spatial streams, that must be supported by all communication devices. In some embodiments, the AP1 is restricted to using, when transmitting FTM packets according to a particular PPDU format, one or more of i) a mandatory rate, ii) a mandatory MCS, and/or iii) a mandatory combination of a) an MCS, and b) a number of spatial streams, for the particular PPDU format, as specified by the communication protocol (even if channel conditions and capabilities of AP2 would allow using a higher rate, a higher MCS, and/or a higher number of spatial streams). Using a mandatory rate, a mandatory MCS, and/or a mandatory number of spatial streams for the FTM transmissions increases the probability that the observing station 212 will correctly receive the FTM packets from AP1 and the ACKs from AP2.

To facilitate the observing station 212 in observing FTM exchanges between AP1 and AP2, AP1 may transmit FTM scheduling information to the observing station 212, where the FTM scheduling information provides information regarding when the FTM burst 270 will occur. In some embodiments, AP1 transmits FTM scheduling information in one or more beacon frames, and the observing station 212 obtains the FTM scheduling information from the one or more beacon frames. In some embodiments, AP1 transmits FTM scheduling information in one or more broadcast packets, and the observing station 212 obtains the FTM scheduling information from the one or more broadcast packets. In some embodiments, the observing station 212 transmits a request packet to AP1, the request packet including information that prompts AP1 to transmit FTM scheduling information in one or more FTM response packets to the observing station 212. The observing station 212 obtains the FTM scheduling information from the one or more FTM response packets, in some embodiments.

Observing, by a first communication device, of FTM packet exchanges between a second communication device and a third communication device for range measurement purposes, such as discussed above in connection with FIGS. 2A and 2B, is sometimes referred to as "snoop-based range measurement."

Figure 3:
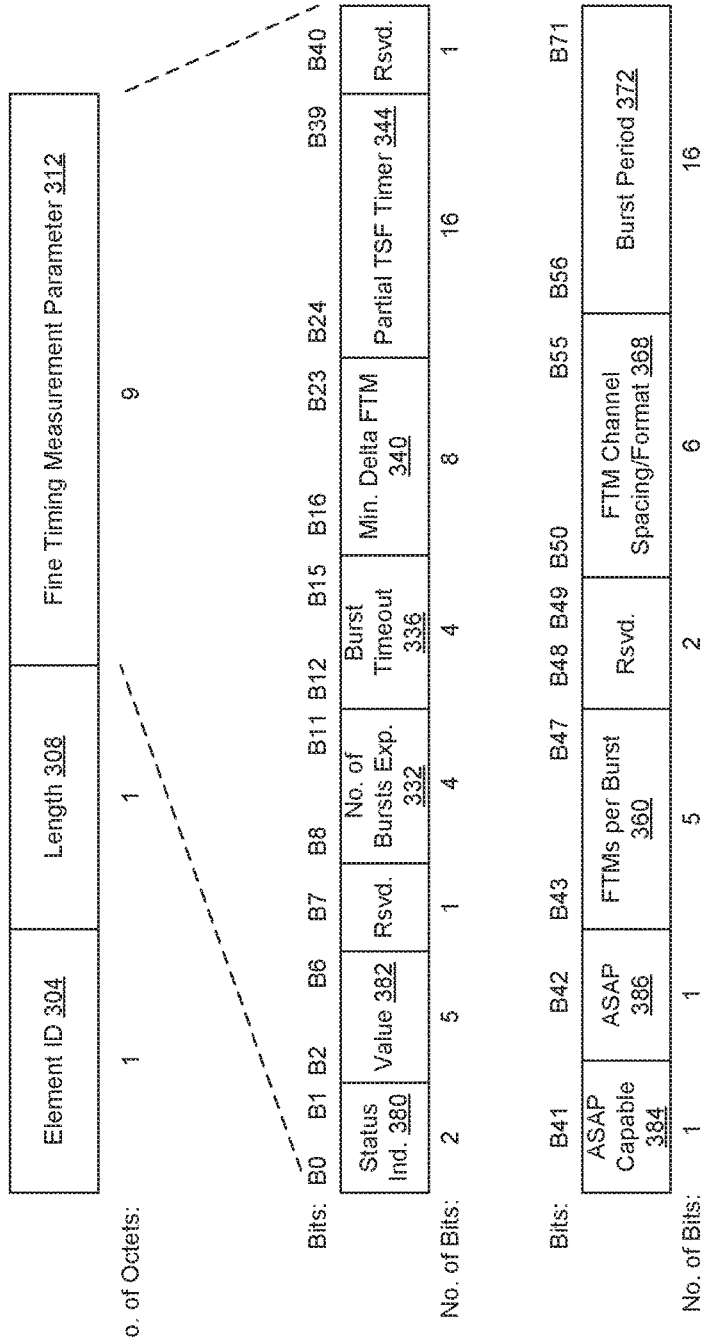
FIG. 3 is a diagram of an example information element that includes scheduling information for a single range measurement session between two communication devices, according to an embodiment.

FIG. 3 is a diagram of an example information element (IE) 300 that is utilized by a first communication device to provide FTM scheduling information to one or more client stations in preparation for snoop-based range measurements, according to an embodiment. The IE 300 includes an element identifier (ID) field 304 having a value indicating that the IE 300 corresponds to FTM scheduling information. In some embodiments, the value the ID field 304 also indicates that the IE 300 corresponds to FTM scheduling information for snoop-based range measurements.

The IE 300 also includes a length field 308 that includes a value indicating a length of the IE 300. The IE 300 also includes an FTM parameter field 312 for including FTM information regarding a single FTM session.

For example, the FTM parameter field 312 includes a number of bursts exponent field 332 that specifies an exponent value exp corresponding to a number of FTM bursts in the FTM session specified by 2^exp. In some embodiments, the bursts exponent field 332 is replaced with a number of bursts field having a value that directly specifies number of FTM bursts in the FTM session.

A burst timeout field 336 specifies a duration of each burst in the FTM session.

A minimum delta FTM field 340 specifies a minimum time between consecutive FTM packets (e.g., measured from a start of an FTM packet to a start of a next FTM packet) within a burst.

A partial TSF timer field 344 indicates a time when the first burst of the FTM session starts.

An FTMs per burst field 360 specifies a number of FTM packets in each FTM burst.

An FTM channel spacing/format field 368 specifies information regarding the channel via which FTM packets will be transmitted and a PHY protocol data unit (PPDU) format that will be used during the FTM session. For example, in an illustrative embodiment, the field 368 specifies information such as a channel bandwidth to be used, a PPDU format (e.g., IEEE 802.11n, IEEE 802.11ac, etc.), etc.

A burst period field 372 specifies an interval between two bursts in the FTM session.

Although FIG. 3 illustrates fields having certain lengths arranged in a certain order, FIG. 3 is merely an example, and fields have other suitable lengths and positions in other embodiments. As an example, one or more reserved fields (Rsvd.) in FIG. 3 are omitted, have different sizes, etc., in some embodiments. As another example, one or more of a status indication field 380, a value field 382, an "as soon as possible" (ASAP) capable field 384, and/or an ASAP field 386 are omitted, in various embodiments.

In some embodiments, one or more of other fields not illustrated in FIG. 3 are included in the IE 300. For example, in some embodiments, the IE 300 includes a peer BSSID field for identifying an AP to which FTM packets will be transmitted. For instance, in some embodiments, observing stations identify FTM packets of interest based on a source address or identifier (sometimes referred to as a "transmitter address" or "transmitter ID") in the FTM packets as well as a recipient of the FTM packets.

In some embodiments and/or scenarios, communication devices in a communication system have different capabilities with regard to channel bandwidths, modulation and coding schemes (MCSs), PPDU formats, etc. For example, some wireless communication protocols define different versions of the protocol, where more recent versions generally specify more capabilities (e.g., wider channel bandwidths, higher MCSs providing higher throughputs, etc.) as compared to older versions, but where the more recent versions are backward compatible with the older versions. For instance, with the IEEE 802.11 Standard, the most recent IEEE 802.11ac Standard permits channel bandwidths of 20 MHz, 40 MHz, 80 MHz, and 160 MHz; the IEEE 802.11n Standard permits channel bandwidths of only 20 MHz and 40 MHz; and the older IEEE 802.11a Standard permits only a channel bandwidth of only 20 MHz. Additionally, the IEEE 802.11ac Standard provides higher MCSs than both the IEEE 802.11n Standard and the IEEE 802.11a Standard; and the IEEE 802.11n Standard provides higher MCSs than the IEEE 802.11a Standard. Also, the IEEE 802.11ac Standard defines a different PPDU format (sometimes referred to as a very high throughput (VHT) PPDU format) than both the IEEE 802.11n Standard and the IEEE 802.11a Standard; and the IEEE 802.11n Standard defines a different PPDU format (sometimes referred to as a high throughput (HT) PPDU format) than the format defined by the IEEE 802.11a Standard (sometimes referred to as a legacy PPDU format).

Thus, in some embodiments and/or scenarios, when AP1 transmits an FTM burst to AP2 using a set of transmission characteristics including i) a channel bandwidth, ii) a PPDU format, and iii) an MCS, where the set of transmission characteristics is supported by a first set of one or more client device but is not supported by a second set of one or more client devices, the second set of one or more client devices will not be able to observe the FTM burst for snoop-based range measurements.

In some embodiments, AP1 schedules multiple FTM sessions with AP2 to facilitate snoop-based range measurements by multiple client devices having different communication capabilities, where each session uses a different set of transmission characteristics (e.g., one or more of i) a different channel bandwidth, ii) a different PPDU format, and/or iii) a different MCS). In some embodiments, AP1 schedules multiple FTM sessions with multiple other APs to facilitate snoop-based range measurements by multiple client devices, where different sessions may use a same or different set of transmission characteristics (e.g., one or more of i) a different channel bandwidth, ii) a different PPDU format, and/or iii) a different MCS).

Figure 4:
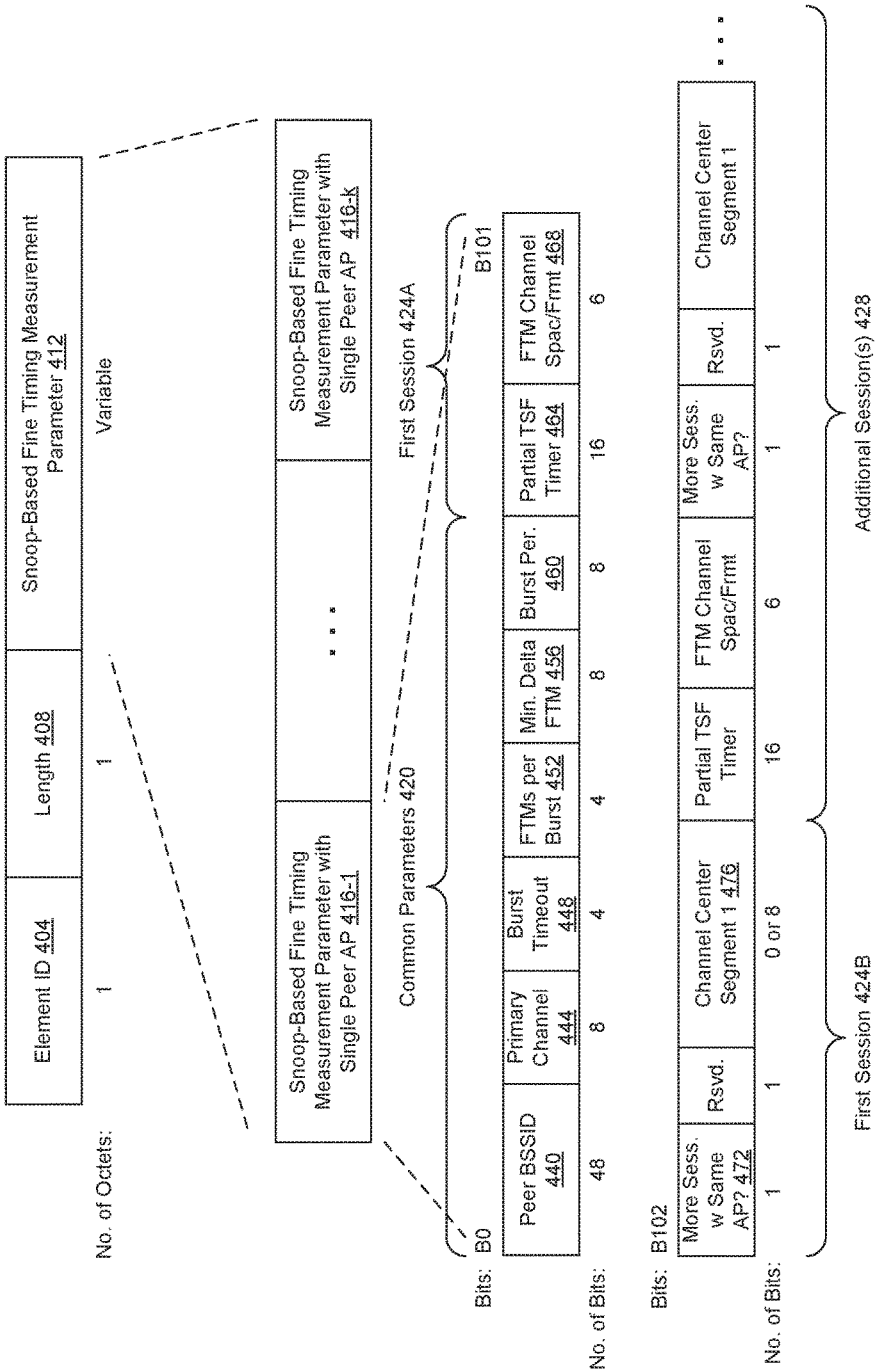
FIG. 4 is a diagram of an example information element that includes scheduling information for a multiple range measurement sessions between two or more communication devices, according to an embodiment.

FIG. 4 is a diagram of an example IE 400 that is utilized by an AP to provide FTM scheduling information to one or more client stations in preparation for snoop-based range measurements, according to an embodiment. The IE 400 includes an element ID field 404 having a value indicating that the IE 400 corresponds to FTM scheduling information for snoop-based range measurements. The IE 400 also includes a length field 408 that includes a value indicating a length of the IE 400. The IE 400 also includes a snoop-based FTM range measurement parameter field 412 for including FTM information regarding one or more FTM sessions with one or more other APs for purposes of snoop-based range measurements.

Figure 5:
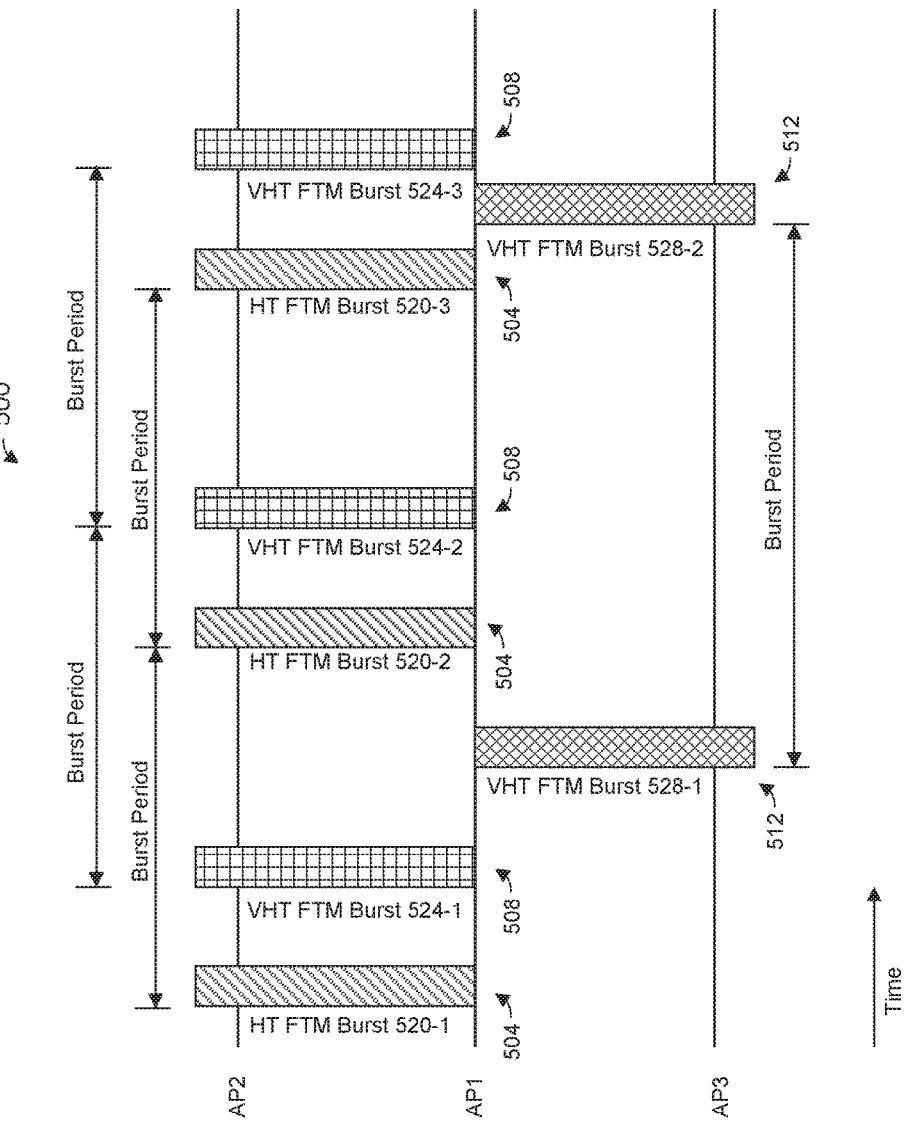
FIG. 5 is a signal diagram that illustrates an example of a set multiple range measurement signal exchange sessions between multiple communication devices, according to an embodiment.

For example, the field 412 includes one or more snoop-based FTM range measurement parameter fields 416, where each field 416 specifies FTM session parameters corresponding to a single respective peer AP. For instance, FIG. 5 illustrates an AP1 performing FTM packet exchanges with a peer AP2 and a peer AP3. Thus, in an embodiment, a first field 416-1 specifies FTM session parameters for FTM packet exchanges with AP2, and a second field 416-2 specifies FTM session parameters for FTM packet exchanges with AP3, according to an embodiment.

Each field 416 specifies FTM session parameters for one or more FTM sessions with a single respective peer AP. For example, FIG. 5 illustrates multiple AP1 FTM sessions with the peer AP2 (e.g., a first FTM session and a second FTM session). Thus, in an embodiment, the first field 416-1 specifies parameters for the first FTM session with AP2, as well as parameters for the second FTM session with AP2, according to an embodiment.

In an embodiment, each field 416 includes a first portion 420 having parameters that are common to the one or more FTM sessions corresponding to the field 416, and a second portion 424 having parameters that are specific to a first FTM session. If the field 416 includes parameters for multiple FTM sessions, the field includes one or more third portions 428 having parameters that are specific to one or more respective additional FTM sessions, according to an embodiment.

The portion 420 includes a peer basic service set identifier (BSSID) field 440 that specifies a BSSID of the peer AP to which AP1 will transmit FTM bursts. For instance, in the example illustrated in FIG. 5, the peer BSSID field 440 includes a BSSID of AP2, according to an embodiment.

The portion 420 also includes a primary channel field 444 that specifies a primary channel corresponding to each FTM session corresponding to the field 416. In some embodiments, the primary channel has a bandwidth of 20 MHz. In some embodiments in which the primary channel has a bandwidth of 20 MHz and the channel bandwidth is larger than 20 MHz, a client station can identify the channel in which the FTM session will occur based on knowledge of the primary channel along with knowledge of the channel bandwidth (specified in another field as discussed below). For example, in an embodiment, the client station can identify the channel in which the FTM session will occur based on the primary channel and the channel bandwidth using channelization rules specified by a communication protocol.

In some embodiments, at least some communication devices in the system are capable of transmitting via a communication channel that is not contiguous in frequency (e.g., the communication channel includes multiple segments (in frequency) including a first segment (segment 0) and a second segment (segment 1), where segment 0 and segment 1 are separated in frequency). When the communication channel is not contiguous in frequency and includes multiple segments, the primary channel field 444 specifies a primary channel within segment 0, according to an embodiment. In some embodiments, a client station can identify segment 0 based on knowledge of the primary channel along with knowledge of the channel bandwidth and/or knowledge of a format of the channel, e.g., that the channel is not contiguous in frequency (specified in another field as discussed below). For example, in an embodiment, the client station can identify segment 0 based on the primary channel and that the channel has a noncontiguous bandwidth of 160 MHz using channelization rules specified by a communication protocol.

A burst timeout field 448 specifies a duration of each burst in each FTM session corresponding to the field 416.

An FTMs per burst field 452 specifies a number of FTM packets in each FTM burst in each FTM session corresponding to the field 416.

A minimum delta FTM field 456 specifies a minimum time between consecutive FTM packets (e.g., measured from a start of an FTM packet to a start of a next FTM packet) within each burst in each FTM session corresponding to the field 416.

A burst period field 460 specifies an interval between two bursts in each FTM session corresponding to the field 416.

The portion 424 specifying parameters for the first FTM session includes a partial TSF timer field 464 that indicates a time when the first burst of the first FTM session starts.

An FTM channel spacing/format field 468 specifies information regarding the channel via which FTM packets will be transmitted and a PPDU format that will be used during the FTM session. For example, in an illustrative embodiment, the field 468 specifies information such as a channel bandwidth to be used, a PPDU format (e.g., IEEE 802.11n, IEEE 802.11ac, etc.), etc. In an embodiment, the FTM channel spacing/format field 468 specifies whether the channel bandwidth is 20 MHz, 40 MHz, 80 MHz, 160 MHz, contiguous, or 160 MHz, noncontiguous, (e.g., a first 80 MHz segment (segment 0) and a second 80 MHz segment (segment 1), where segment 0 and segment 1 are separated in frequency). In other embodiments, other suitable channel bandwidths are utilized, and thus the FTM channel spacing/format field 468 specifies another suitable channel bandwidth.

In an embodiment, the FTM channel spacing/format field 468 specifies whether an HT PPDU format will be utilized or a VHT PPDU format will be utilized. In other embodiments, other suitable PPDU formats are utilized, and thus the FTM channel spacing/format field 468 specifies another suitable PPDU format.

A field 472 indicates whether the field 416 includes FTM scheduling information for another FTM session with the same peer AP. For example, when a first value of the field 472 indicates that there is no further FTM scheduling information for another FTM session with the same peer AP, the portion(s) 428 are omitted from the field 416, according to an embodiment. As another example, when a second value of the field 472 indicates that there is further FTM scheduling information for one or more further FTM sessions with the same peer AP, one or more portions 428 are included in the field 416, according to an embodiment.

A channel center segment 1 field 476 specifies information indicating a center frequency of a segment 1 of an 80+80 MHz communication channel.

When included, the portion(s) 428 specify parameters for one or more additional FTM sessions. In an embodiment, each portion 428 includes the same fields as the portion 424, but specifying parameters for the one or more additional FTM sessions.

Although FIG. 4 illustrates fields having certain lengths arranged in a certain order, FIG. 4 is merely an example, and fields have other suitable lengths and positions in other embodiments. In some embodiments, one or more of the fields illustrated in FIG. 4 are omitted. For example, in some embodiments, the peer BSSID field 440 is omitted. For instance, in some embodiments, observing stations identify FTM packets of interest based on a source address or identifier in the FTM packets, and thus the observing stations do not need to know the recipient of the FTM packets. As another example, one or more reserved fields (Rsvd.) in FIG. 4 are omitted, have different sizes, etc. In some embodiments, one or more of other fields not illustrated in FIG. 4 are included in the IE 400.

Thus, in some embodiments, an AP provides FTM scheduling information in a single IE (such as the IE 400 of FIG. 4 or another suitable IE) for multiple FTM sessions with one or more other APs for purposes of snoop-based range measurements. In some embodiments, an AP includes the single IE (with FTM scheduling information for multiple FTM sessions with one or more other APs) in a beacon frame. In some embodiment, an AP includes the single IE (with FTM scheduling information for multiple FTM sessions with one or more other APs) in a broadcast frame. In some embodiment, an AP includes the single IE (with FTM scheduling information for multiple FTM sessions with one or more other APs) in an FTM response packet sent by the AP in response to an FTM request packet from an observing client station. Thus, in various embodiments, an AP includes FTM scheduling information for multiple FTM sessions with one or more other APs in a single beacon frame, in a single broadcast packet, in a single FTM response packet, etc.

FIG. 5 illustrates a set 500 of multiple FTM sessions with multiple APs as an illustrative example. In an embodiment, scheduling information for the set 500 is included in a single IE (such as the IE 400 of FIG. 4 or another suitable IE). In some embodiments, scheduling information for the set 500 is included in a single beacon frame, a single broadcast packet, a single FTM response packet, etc.

The set 500 includes a first FTM session 504 between a first AP (AP1) and a second AP (AP2). The set 500 also includes a second FTM session 508 between AP1 and AP2. The set 500 also includes a third FTM session 512 between AP1 and a third AP (AP3).

The first FTM session 504 includes a first burst 520-1, a second burst 520-2, and a third burst 520-3. The second FTM session 508 includes a first burst 524-1, a second burst 524-2, and a third burst 524-3. The third FTM session 512 includes a first burst 528-1 and a second burst 528-2.

Referring to FIGS. 4 and 5, a BSSID of AP2 is specified in field 440 within a first field 416-1, according to an embodiment. In some embodiments, however, the field 440 is omitted and the IE 400 does not specify a BSSID of AP2. A primary channel corresponding to the first FTM session 504 and the second FTM session is specified in field 444 within the first field 416-1, according to an embodiment. A duration of each burst 520, 524 is specified in the field 448 within the first field 416-1, according to an embodiment. A number of FTM packets in each burst 520, 524 is specified in the field 452 within the first field 416-1, according to an embodiment. A minimum time between consecutive FTM packets each burst 520, 524 is specified in the field 456 within the first field 416-1, according to an embodiment. A burst period for burst sessions 504 and 508 is specified in the field 460 within the first field 416-1, according to an embodiment.

A time at which burst 520-1 begins in indicated by the field 464 within the first field 416-1, according to an embodiment. A channel bandwidth corresponding to the first FTM session 504 is indicated by the field 468 within the first field 416-1, according to an embodiment. Additionally, the field 468 within the first field 416-1 indicates that FTM packets in the first FTM session 504 have an HT PPDU format, according to an embodiment.

The field 472 in the first field 416-1 is set to a first value that indicates there is another FTM session with AP2, and thus the first field 416-1 includes the portion 428. A time at which burst 524-1 begins in indicated by the partial TSF timer field in the portion 428 within the first field 416-1, according to an embodiment. A channel bandwidth corresponding to the second FTM session 508 is indicated by the FTM channel spacing/format field in the portion 428 within the first field 416-1, according to an embodiment. Additionally, the FTM channel spacing/format field in the portion 428 within the first field 416-1 indicates that FTM packets in the second FTM session 508 have a VHT PPDU format, according to an embodiment. The "more sessions with same AP" field in the portion 428 within the first field 416-1 is set to a second value that indicates there is not another FTM session with AP2, and thus the first field 416-1 does not include any further portions 428.

A BSSID of AP3 is specified in field 440 within a second field 416-2, according to an embodiment. In some embodiments, however, the field 440 is omitted and the IE 400 does not specify a BSSID of AP3. A primary channel corresponding to the third FTM session 512 is specified in field 444 within the second field 416-2, according to an embodiment. A duration of each burst 528 is specified in the field 448 within the second field 416-2, according to an embodiment. A number of FTM packets in each burst 528 is specified in the field 452 within the second field 416-2, according to an embodiment. A minimum time between consecutive FTM packets each burst 528 is specified in the field 456 within the second field 416-2, according to an embodiment. A burst period for burst session 512 is specified in the field 460 within the second field 416-2, according to an embodiment.

A time at which burst 528-1 begins in indicated by the field 464 within the second field 416-2, according to an embodiment. A channel bandwidth corresponding to the third FTM session 512 is indicated by the field 468 within the second field 416-2, according to an embodiment. Additionally, the field 468 within the second field 416-2 indicates that FTM packets in the third FTM session 512 have a VHT PPDU format, according to an embodiment. The field 472 in the second field 416-2 is set to the second value that indicates there is not another FTM session with AP3, and thus the field 416-2 does not include any portions 428.

In some embodiments, different burst periods are scheduled for different FTM sessions with a single peer AP. Thus, in some embodiments, the field 416 includes respective burst period fields (similar to the burst period field 460 of FIG. 4) for respective FTM sessions with a single peer AP.

Figure 6:
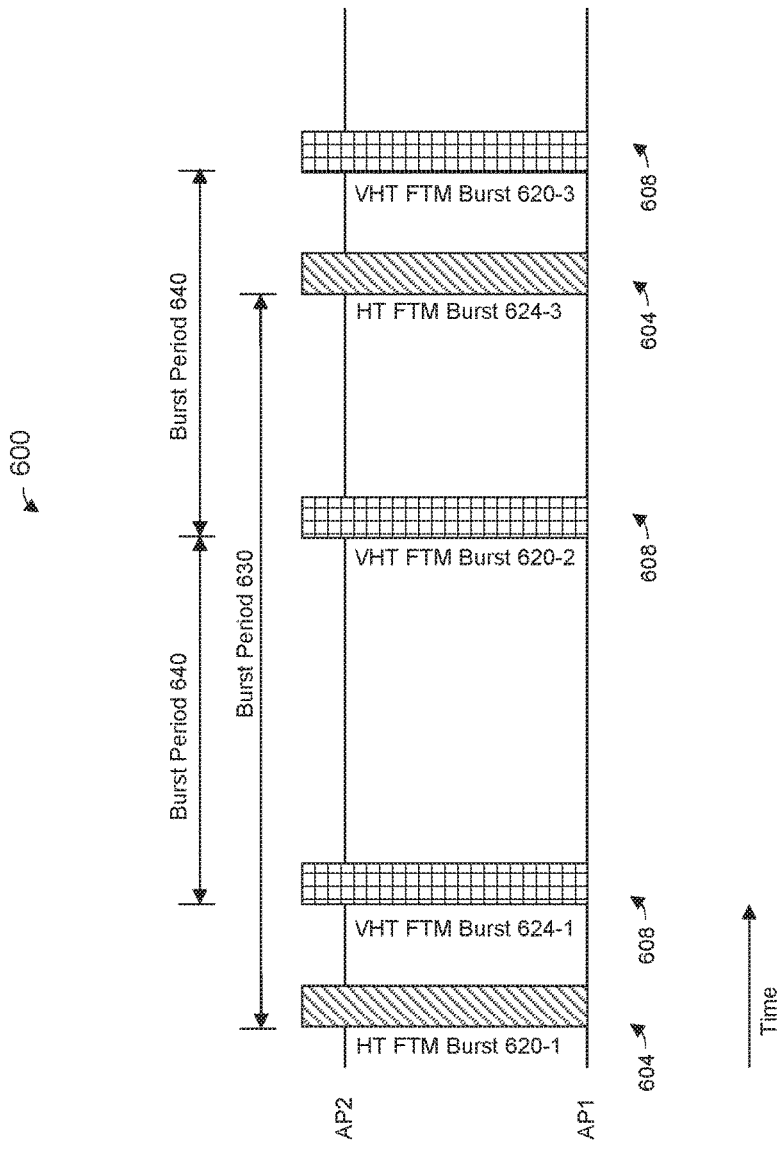
FIG. 6 is a signal diagram that illustrates another example of a set multiple range measurement signal exchange sessions between multiple communication devices, according to an embodiment.

FIG. 6 illustrates a set 600 of multiple FTM sessions with a single peer AP as an illustrative example. In an embodiment, scheduling information for the set 600 is included in a single IE (such as an IE similar to the IE 400 of FIG. 4 or another suitable IE). In some embodiments, scheduling information for the set 600 is included in a single beacon frame, a single broadcast packet, a single FTM response packet, etc.

The set 600 includes a first FTM session 604 between a first AP (AP1) and a second AP (AP2). The set 600 also includes a second FTM session 608 between AP1 and AP2.

The first FTM session 604 includes a first burst 620-1, a second burst 620-2, and a third burst 620-3. The second FTM session 608 includes a first burst 624-1 and a second burst 524-2.

Referring to FIGS. 4 and 6, a BSSID of AP2 is specified in field 440, according to an embodiment. In some embodiments, however, the field 440 is omitted and the IE 400 does not specify a BSSID of AP2. A primary channel corresponding to the first FTM session 604 and the second FTM session 608 is specified in field 444, according to an embodiment. A duration of each burst 620, 624 is specified in the field 448, according to an embodiment. A number of FTM packets in each burst 620, 624 is specified in the field 452, according to an embodiment. A minimum time between consecutive FTM packets each burst 620, 624 is specified in the field 456, according to an embodiment.

A burst period 630 for burst session 604 is specified in the field 460, according to an embodiment. A time at which burst 620-1 begins in indicated by the field 464, according to an embodiment. A channel bandwidth corresponding to the first FTM session 604 is indicated by the field 468, according to an embodiment. Additionally, the field 468 indicates that FTM packets in the first FTM session 504 have an HT PPDU format, according to an embodiment.

The field 472 is set to a first value that indicates there is another FTM session with AP2, and thus the first field 416-1 includes the portion 428.

A burst period 640 for burst session 608 is specified in a burst period field (not shown) in the portion 428, according to an embodiment. A time at which burst 624-1 begins in indicated by the partial TSF timer field in the portion 428, according to an embodiment. A channel bandwidth corresponding to the second FTM session 608 is indicated by the FTM channel spacing/format field in the portion 428, according to an embodiment. Additionally, the FTM channel spacing/format field in the portion 428 indicates that FTM packets in the second FTM session 608 have a VHT PPDU format, according to an embodiment. The "more sessions with same AP" field in the portion 428 is set to a second value that indicates there is not another FTM session with AP2, and thus the first field 416-1 does not include any further portions 428.

Referring again to FIG. 4, in some embodiments, one or more fields in the common parameters portion 420 are instead included in the portions 424 and 428 so that other parameters can be made different for different burst sessions with the same peer AP. For example, in various embodiments, various suitable combinations of one or more of the following parameters can be made different for different burst sessions with the same peer AP: burst timeout, FTMs per burst, minimum delta FTM, burst period, etc. Similarly, in some embodiments, one or more fields in the portions 424 and 428 are instead included in the portion 420 so that other parameters are made common for different burst sessions with the same peer AP. For instance, in various embodiments, various suitable combinations of one or more of the following parameters are made the common for different burst sessions with the same peer AP: channel bandwidth, PPDU format, etc.

Figure 7A:
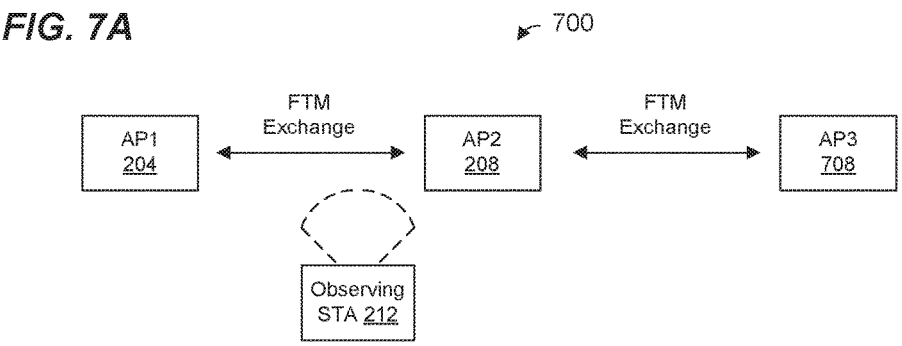
FIG. 7A is a block diagram of an example system in which an observing station observes range measurement signals exchanged among three access points, according to an embodiment.

Referring again to FIG. 2A, in some embodiments, while AP1 exchanges range measurement signals with the AP2, another AP (AP3) also exchanges range measurement signals with the AP2. FIG. 7A is a diagram of an example system 700 in which a first AP 204 (AP1) exchanges range measurement signals with a second AP 208 (AP2), and a third AP 704 (AP3) also exchanges range measurement signals with AP2, according to an embodiment. The system 700 is similar to the system 200 of FIG. 2A, and like-numbered elements are not further described in detail. In some embodiments and/or scenarios, the observing station 212 does not intend to observe the range measurement signals exchanged between AP3 and AP2.

Figure 7B:
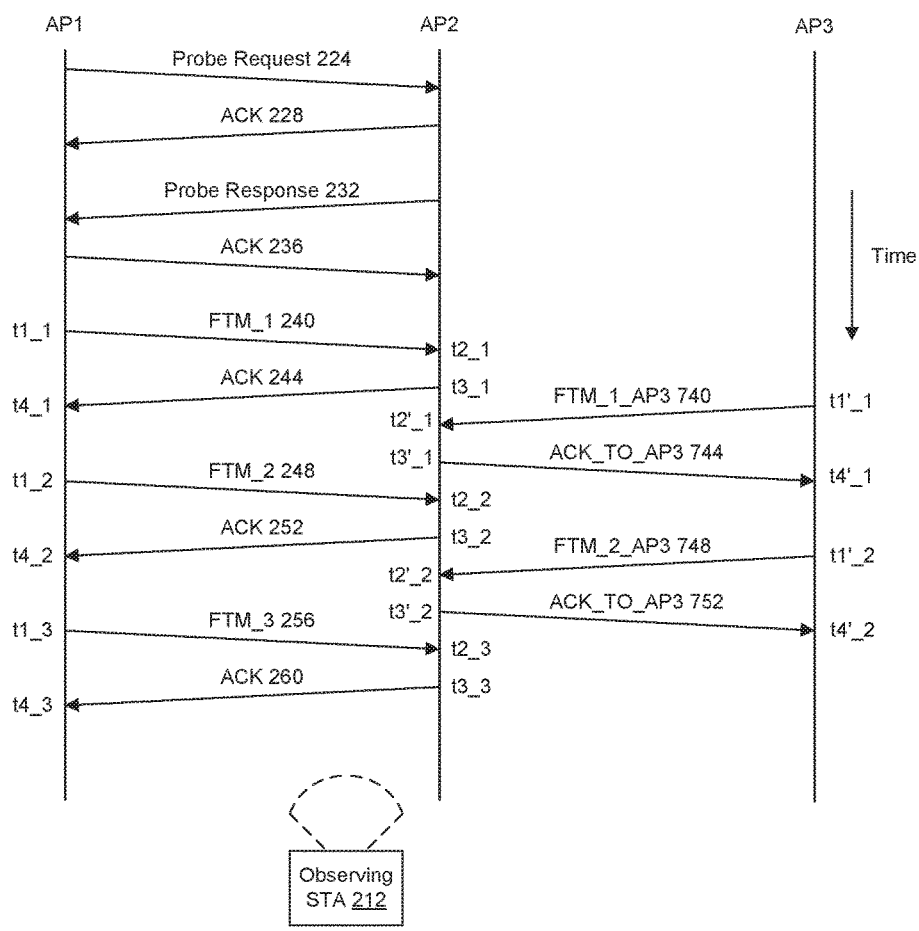
FIG. 7B is a signal timing diagram illustrating example exchanges of range measurement signals among the three access points of FIG. 7A, according to an embodiment.

FIG. 7B is a signal timing diagram illustrating FTM exchanges between AP1 and AP2, in which the client station 212 observes FTM signal exchanges between AP1 and AP2. FIG. 7B also illustrates FTM exchanges between AP3 and AP2. The FTM exchanges between AP1 and AP2 are the same as illustrated in FIG. 2B, and like-numbered elements are not further described in detail.

AP3 generates an FTM packet 740 (FTM_1_AP3). At a time t1'_1, AP3 transmits the FTM packet 740, and AP3 records the time t1'_1. In an embodiment, the time t1'_1 corresponds to an event at which a beginning of the FTM packet 740 is transmitted.

At time t2'_1, AP2 receives the FTM packet 240. In response to the FTM packet 740, AP2 generates and transmits an ACK packet 744. In an embodiment, AP2 transmits the ACK packet 744 at a time t3'_1.

At time t4'_1, AP3 receives the ACK packet 744. In an embodiment, AP3 records the time t4'_1 at which AP3 receives the ACK packet 744. In an embodiment, the time t4'_1 corresponds to an event at which a beginning of the ACK packet 744 is received at AP3.

In particular, as part of a second FTM exchange, AP3 generates an FTM packet 748 (FTM_2_AP3). At a time t1'_2, AP3 transmits the FTM packet 748, and AP3 records the time t1'_2. In an embodiment, the time t1'_2 corresponds to an event at which a beginning of the FTM packet 748 is transmitted. In an embodiment, AP3 generates the FTM packet 748 to include times t1'_1 and t4'_1, e.g., in a PHY payload portion of the FTM packet 748.

At time t2'_2, AP2 receives the FTM packet 748. In response to the FTM packet 748, AP2 generates and transmits an ACK packet 752. In an embodiment, AP2 transmits the ACK packet 752 at a time t3'_2.

At time t4'_2, AP3 receives the ACK packet 752. In an embodiment, AP3 records the time t4'_2 at which AP3 receives the ACK packet 752. In an embodiment, the time t4'_2 corresponds to an event at which a beginning of the ACK packet 752 is received at AP3.

In many wireless communication systems, a communication device performs an initial analysis of a received packet by analyzing a destination address (sometimes referred to as a receiver address or ID) of a received packet to determine whether the communication device should further process the packet. For example, if the destination address in a received packet matches an address of the communication device (e.g., a MAC address of the communication device, an association ID assigned to the communication device, etc.), the communication device assumes that the packet was intended for the communication device and thus the communication device further processes the packet.

In a scenario such as illustrated in FIGS. 7A and 7B, however, if the observing station 212 performs the initial analysis of packets in the FTM exchanges by merely analyzing destination addresses of the packets, this may lead to incorrect range measurements. For example, both i) FTM packets transmitted by AP1 and ii) FTM packets transmitted by AP2 have the destination address set to the address of AP2, in an embodiment. Thus, if the observing station 212 is intending to observe FTM exchanges between AP1 and AP2, the observing station 212 also may process FTM packets transmitted by AP3 (because those FTM packets also have the destination address set to the address of AP2), but assume that the FTM packets actually transmitted by AP3 were instead transmitted by AP1.

Therefore, in some embodiments, the observing station 212 performs an initial analysis of FTM packets in FTM exchanges by analyzing source addresses (sometimes referred to as transmitter addresses or IDs) of the FTM packets. In some embodiments, the observing station 212, in performing the initial analysis of the FTM packets, ignores the destination addresses of the FTM packets. In other embodiments, however, the observing station 212, in performing the initial analysis of the FTM packets, also analyses the destination addresses of the FTM packets.

Referring again to FIG. 4, in embodiments in which the observing station 212, in performing the initial analysis of the FTM packets, ignores the destination addresses of the FTM packets, and when FTM scheduling information is transmitted to the observing station 212 using an IE such as the IE 400, the peer BSSID field 440 can be omitted from the fields 416 of the IE 400. In embodiments in which the observing station 212, in performing the initial analysis of the FTM packets, also processes the destination addresses of the FTM packets, and when FTM scheduling information is transmitted to the observing station 212 using an IE such as the IE 400, the peer BSSID field 440 is included in the fields 416 of the IE 400.

Referring again to FIG. 3, in embodiments in which the observing station 212, in performing the initial analysis of the FTM packets, also processes the destination addresses of the FTM packets, and when FTM scheduling information is transmitted to the observing station 212 using an IE such as the IE 300, a peer BSSID field (e.g., the same as or similar to the peer BSSID field 440 discussed with respect to FIG. 4) is included in the field 312 of the IE 300.

Figure 8:
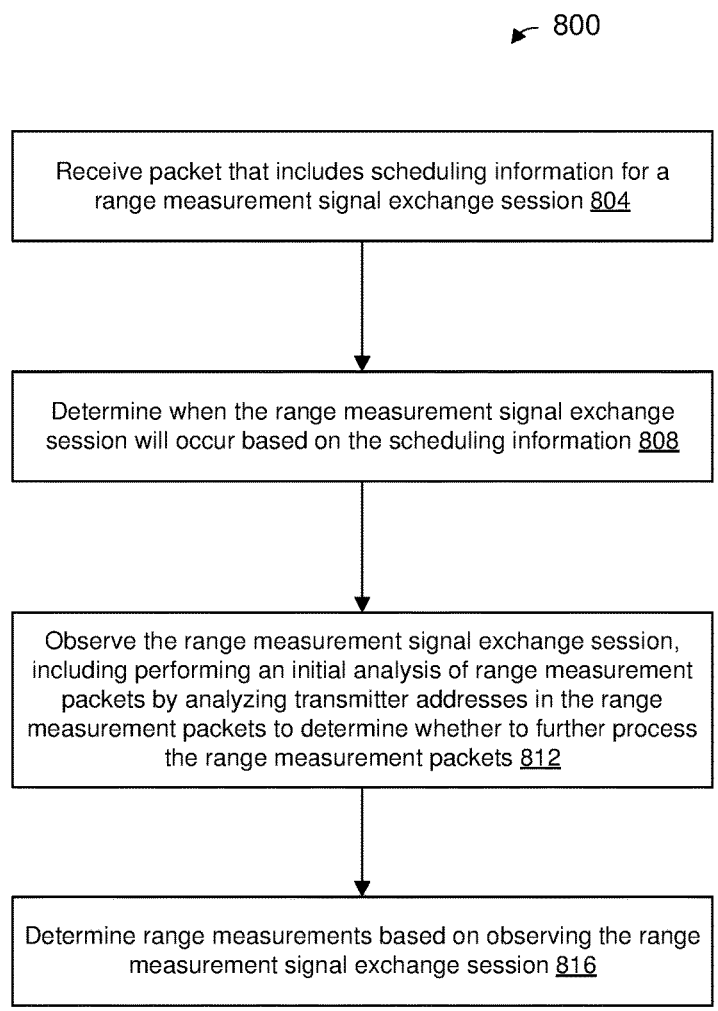
FIG. 8 is a flow diagram of an example method for performing range measurements, according to an embodiment.

FIG. 8 is a flow diagram of an example method 800 for performing range measurements in a wireless communication network, according to an embodiment. In some embodiments, the network interface device 27 of FIG. 1 is configured to implement the method 800, and merely for ease of explanation, the method 800 is described with reference to FIGS. 1, 3, 4, 7A, and 7B. However, the method 800 is utilized with and/or implemented in suitable systems, devices, and/or data formats other than those discussed in connection with in FIGS. 1, 3, 4, 7A, and 7B, in some embodiments.

At block 804, a packet is received at a first communication device, where the packet includes scheduling information for a range measurement signal exchange session signals, where the range measurement signal exchange session involves transmission of range measurement signals from a second communication device to a third communication device. In some embodiments, the packet also includes other scheduling information for one or more other range measurement signal exchange sessions, the one or more other range measurement signal exchange sessions involving transmission of range measurement signals from the second communication device to the third communication device and/or one or more fourth communication devices.

In some embodiments, the packet comprises an IE that includes the scheduling information. For example, in an embodiment, the IE has the same format as discussed with reference to FIG. 3. As another example, in an embodiment, the IE has the same format as discussed with reference to FIG. 4. In other embodiments, the IE has a suitable format different than the example formats discussed with reference to FIGS. 3 and 4.

In some embodiments, the scheduling information received at block 804 includes an address of the second communication device. For example, in an embodiment, the second communication device is an AP, and the scheduling information received at block 804 includes a BSSID of the AP. In some embodiments, however, the scheduling information received at block 804 does not include the address of the second communication device.

In an embodiment, the packet is a beacon packet. In an embodiment, the packet is a broadcast packet. In an embodiment, the packet is an FTM response packet that is responsive to a request packet sent by the first communication device.

At block 808, it is determined when the range measurement signal exchange session will occur based on the scheduling information received at block 804. In some embodiments, block 808 includes determining a time period using the scheduling information.

At block 812, the range measurement signal exchange session is observed by the first communication device responsive to determining when the range measurement signal exchange session will occur at block 808.

In an embodiment, block 812 comprises: performing an initial analysis of range measurement packets received at the first communication device during the time period, including analyzing transmitter addresses in the range measurement packets to determine whether to further process the range measurement packets. In some embodiments, performing the initial analysis also includes analyzing receiver addresses in the range measurement packets to determine whether to further process the range measurement packets.

In some embodiments, performing the initial analysis at block 812 comprises: determining whether the transmitter address of the packet matches an address of the second communication device; in response to determining that the transmitter address of the packet matches the address of the second communication device, determining that the packet should be processed further, and in response to determining that the transmitter address of the packet does not match the address of the second communication device, determining that the packet should be ignored and should not be processed for range measurement purposes.

In some embodiments, performing the initial analysis at block 812 comprises: determining whether i) the transmitter address of the packet matches an address of the second communication device, and ii) the receiver address of the packet matches an address of the third communication device; in response to determining that i) the transmitter address of the packet matches the address of the second communication device, and ii) the receiver address of the packet matches the address of the third communication device, determining that the packet should be processed further; and in response to determining at least one of i) that the transmitter address of the packet does not match the address of the second communication device, or ii) the receiver address of the packet does not match the address of the third communication device, determining that the packet should be ignored and should not be processed for range measurement purposes.

At block 816, range measurements are determined based on the range measurement signal exchange session observed at block 812.

In some embodiments, the method 800 also includes transmitting a request packet that requests the scheduling information, and the packet received at block 804 is responsive to the request packet.

As discussed above, in some embodiments, the network interface device 27 is configured to implement the method 800 at least partially. For example, in an embodiment, the PHY processor 20 is configured to perform block 804. In an embodiment, the MAC processor 28 is configured to implement block 808. In an embodiment, the MAC processor 28 is configured to control the network interface device 27 to observe the range measurement signal exchange session at block 812. In an embodiment, MAC processor 28 is configured to implement the block 812. In another embodiment, the host processor 26 is configured to implement at least a portion of the block 812.

Figure 9:
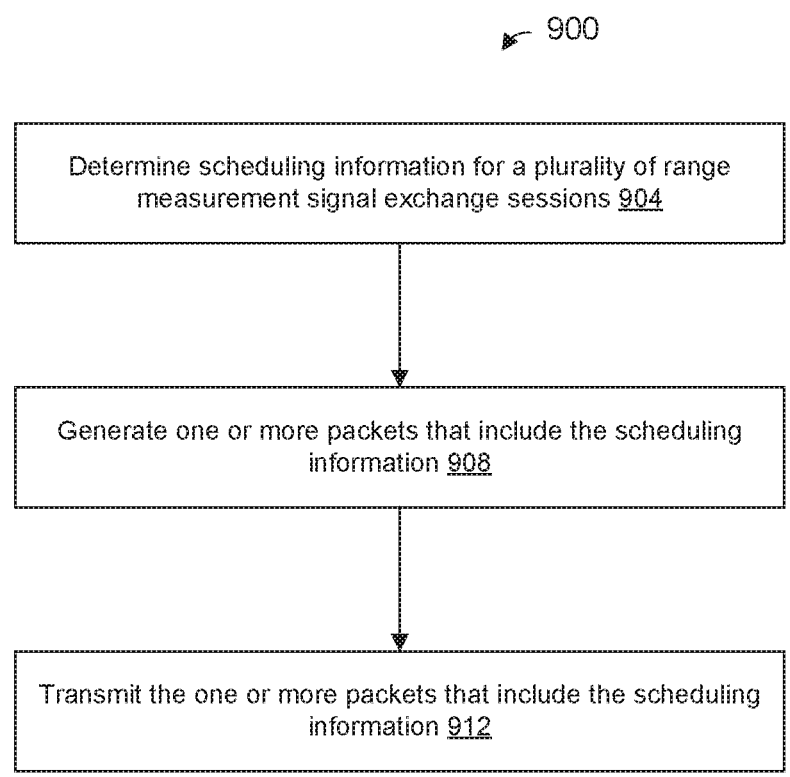
FIG. 9 is a flow diagram of an example method for facilitating performing range measurements, according to an embodiment.

FIG. 9 is a flow diagram of an example method 900 for facilitating performance of range measurements in a wireless communication network, according to an embodiment. In some embodiments, the network interface device 16 of FIG. 1 is configured to implement the method 900, and merely for ease of explanation, the method 700 is described with reference to FIGS. 1, 3, and 4. However, the method 900 is utilized with and/or implemented in suitable systems, devices, and/or data formats other than those discussed in connection with in FIGS. 1, 3, and 4, in some embodiments.

At block 904, scheduling information for one or more range measurement signal exchange sessions are determined, the one or more range measurement signal exchange sessions involving transmission of range measurement signals from a first communication device to one or more second communication devices. For example, in an embodiment, scheduling information for one or more FTM signal exchange sessions are determined.

At block 908, one or more packets are generated to include the scheduling information generated at block 904. In an embodiment, one or more IEs are generated to include the scheduling information generated at block 904, and the one or more packets are generated to include the one or more IEs. For example, in various embodiments, the one or more IEs have a format the same as or similar to the formats discussed with reference to FIG. 3. As another example, in various embodiments, the one or more IEs have a format the same as or similar to the formats discussed with reference to FIG. 4. In other embodiments, the one or more IEs have a suitable format other than the example formats discussed with reference to FIGS. 3 and 4.

In an embodiment, the one or more packets include a beacon packet. In an embodiment, the one or more packets include a broadcast packet. In an embodiment, the one or more packets include an FTM response packet that is responsive to a request packet received by the AP 14-1.

At block 912, the one or more packets generated at block 908 are transmitted so that a third communication device can use the scheduling information to observe one or more of the range measurement signal exchange sessions in the one or more range measurement signal exchange sessions between the first communication device and the one or more second communication devices, to determine range measurements.

As discussed above, in some embodiments, the network interface device 16 is configured to implement the method 900. For example, in an embodiment, the MAC processor 18 is configured to perform block 904. In an embodiment, the MAC processor 18 and the PHY processor 20 are configured to implement block 908. For example, in an embodiment, the MAC processor 18 is configured to generate one or more IEs that include the scheduling information, and generate one or more MAC layer data units that include the one or more IEs. In an embodiment, the PHY processor 20 receives the one or more MAC layer data units and generates one or more PPDUs by encapsulating the one or more MAC layer data units in one or more PHY headers. In an embodiment, the network interface device 16 is configured to cause the AP 14-1 to transmit the one or more packets via one or more of the antennas 24.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
receiving, at a first communication device, a packet that includes scheduling information for a range measurement signal exchange session between a second communication device and a third communication device;
determining, at the first communication device, when the range measurement signal exchange session will occur using the scheduling information in the packet;
in response to determining when the range measurement signal exchange session will occur using the scheduling information in the packet, observing, with the first communication device, the range measurement signal exchange session, including
performing an initial analysis of range measurement packets received at the first communication device by analyzing transmitter addresses in the range measurement packets to determine whether to further process the range measurement packets for range measurement purposes, wherein the range measurement packets are packets for which the second communication device and the third communication device collectively record respective transmit times and respective receipt times; and
determining, at the first communication device, range measurements based on observing the one range measurement signal exchange session.

2. The method of claim 1, wherein:
determining when the range measurement signal exchange session will occur using the scheduling information in the packet includes determining a time period when the range measurement signal exchange session will occur;
performing the initial analysis of range measurement packets received at the first communication device includes
determining whether transmitter addresses in range measurement packets received during the time period match an address of the second communication device,
determining to further process range measurement packets received during the time period and having transmitter addresses that match the address of the second communication device, and
determining not to further process range measurement packets received during the time period and having transmitter addresses that do not match the address of the second communication device.

3. The method of claim 2, wherein performing the initial analysis of range measurement packets received at the first communication device received during the time period includes:
ignoring receiver addresses in range measurement packets received during the time period.

4. The method of claim 1, wherein:
determining when the range measurement signal exchange session will occur using the scheduling information in the packet includes determining a time period when the range measurement signal exchange session will occur;
performing the initial analysis of range measurement packets received at the first communication device includes
determining whether transmitter addresses in range measurement packets received during the time period match an address of the second communication device,
determining whether receiver addresses in range measurement packets received during the time period match an address of the third communication device,
determining to further process range measurement packets received during the time period and having i) transmitter addresses that match the address of the second communication device, and ii) receiver addresses in range measurement packets that match the address of the third communication device,
determining not to further process range measurement packets received during the time period and having transmitter addresses that do not match the address of the second communication device, and
determining not to further process range measurement packets received during the time period and having receiver addresses that do not match the address of the third communication device.

5. The method of claim 4, further comprising:
determining, at the first communication device, the address of the third communication device using the scheduling information for the range measurement signal exchange session between the second communication device and the third communication device.

6. The method of claim 5, wherein:
the scheduling information for the range measurement signal exchange session between the second communication device and the third communication device includes a basic service set identifier (BSSID) corresponding to the third communication device; and
determining, at the first communication device, the address of the third communication device comprises determining the address of the third communication device as the BSSID included in the scheduling information.

7. An apparatus, comprising:
a network interface device associated with a first communication device, wherein the network interface device includes one or more integrated circuits (ICs) configured to
receive a packet that includes scheduling information for a range measurement signal exchange session between a second communication device and a third communication device,
determine when the range measurement signal exchange session will occur using the scheduling information in the packet, and
in response to determining when the range measurement signal exchange session will occur using the scheduling information in the packet, observe the range measurement signal exchange session, including
performing an initial analysis of range measurement packets received at the first communication device by analyzing transmitter addresses in the range measurement packets to determine whether to further process the range measurement packets for range measurement purposes, wherein the range measurement packets are packets for which the second communication device and the third communication device collectively record respective transmit times and respective receipt times; and
wherein the one or more ICs are, or a separate processor of the apparatus is, configured to determine range measurements based on observing the one range measurement signal exchange session.

8. The apparatus of claim 7, wherein the one or more ICs are configured to:
determine a time period when the range measurement signal exchange session will occur;
perform the initial analysis of range measurement packets received at the first communication device at least by
determining whether transmitter addresses in range measurement packets received during the time period match an address of the second communication device,
determining to further process range measurement packets received during the time period and having transmitter addresses that match the address of the second communication device, and
determining not to further process range measurement packets received during the time period and having transmitter addresses that do not match the address of the second communication device.

9. The apparatus of claim 8, wherein the one or more ICs are configured to:
ignore receiver addresses in range measurement packets received during the time period while performing the initial analysis.

10. The apparatus of claim 7, wherein the one or more ICs are configured to:
determine a time period when the range measurement signal exchange session will occur;
perform the initial analysis of range measurement packets received at the first communication device at least by
determining whether transmitter addresses in range measurement packets received during the time period match an address of the second communication device,
determining whether receiver addresses in range measurement packets received during the time period match an address of the third communication device,
determining to further process range measurement packets received during the time period and having i) transmitter addresses that match the address of the second communication device, and ii) receiver addresses in range measurement packets that match the address of the third communication device,
determining not to further process range measurement packets received during the time period and having transmitter addresses that do not match the address of the second communication device, and
determining not to further process range measurement packets received during the time period and having receiver addresses that do not match the address of the third communication device.

11. The apparatus of claim 10, wherein the one or more ICs are configured to:
determine the address of the third communication device using the scheduling information.

12. The apparatus of claim 11, wherein:
the scheduling information for the range measurement signal exchange session between the second communication device and the third communication device includes a basic service set identifier (BSSID); and
the one or more ICs are configured to determine the address of the third communication device as the BSSID included in the scheduling information.

13. A non-transitory tangible computer readable medium or media, storing machine readable instructions that, when executed by one or more processors of a first communication device, cause the one or more processors to:
determine when a range measurement signal exchange session between a second communication device and a third communication device will occur using scheduling information in a packet received by the first communication device;
in response to determining when the range measurement signal exchange session will occur using the scheduling information in the packet,
perform an initial analysis of range measurement packets received at the first communication device as part of an observation, by the first communication device, of the range measurement signal exchange session, including
analyzing transmitter addresses in the range measurement packets to determine whether to further process the range measurement packets for range measurement purposes, wherein the range measurement packets are packets for which the second communication device and the third communication device collectively record respective transmit times and respective receipt times; and
determine range measurements based on observing the range measurement signal exchange session.

14. The non-transitory tangible computer readable medium or media of claim 13, further storing machine readable instructions that, when executed by one or more processors, cause the one or more processors to:
determine a time period when the range measurement signal exchange session will occur;
perform the initial analysis of range measurement packets received at the first communication device at least by
determining whether transmitter addresses in range measurement packets received during the time period match an address of the second communication device,
determining to further process range measurement packets received during the time period and having transmitter addresses that match the address of the second communication device, and
determining not to further process range measurement packets received during the time period and having transmitter addresses that do not match the address of the second communication device.

15. The non-transitory tangible computer readable medium or media of claim 14, further storing machine readable instructions that, when executed by one or more processors, cause the one or more processors to:
perform the initial analysis of range measurement packets received at the first communication device received during the time period at least by
ignoring receiver addresses in range measurement packets received during the time period.

16. The non-transitory tangible computer readable medium or media of claim 13, further storing machine readable instructions that, when executed by one or more processors, cause the one or more processors to:
determine a time period when the range measurement signal exchange session will occur;
perform the initial analysis of range measurement packets received at the first communication device at least by
determining whether transmitter addresses in range measurement packets received during the time period match an address of the second communication device,
determining whether receiver addresses in range measurement packets received during the time period match an address of the third communication device,
determining to further process range measurement packets received during the time period and having i) transmitter addresses that match the address of the second communication device, and ii) receiver addresses in range measurement packets that match the address of the third communication device,
determining not to further process range measurement packets received during the time period and having transmitter addresses that do not match the address of the second communication device, and
determining not to further process range measurement packets received during the time period and having receiver addresses that do not match the address of the third communication device.

17. The non-transitory tangible computer readable medium or media of claim 16, further storing machine readable instructions that, when executed by one or more processors, cause the one or more processors to:
determine the address of the third communication device using the scheduling information for the range measurement signal exchange session between the second communication device and the third communication device.

18. The non-transitory tangible computer readable medium or media of claim 17, wherein:
the scheduling information for the range measurement signal exchange session between the second communication device and the third communication device includes a basic service set identifier (BSSID) corresponding to the third communication device; and
computer readable medium or media further store machine readable instructions that, when executed by one or more processors, cause the one or more processors to
determine the address of the third communication device as the BSSID included in the scheduling information.

* * * * *